United States Patent
Choiniere et al.

(10) Patent No.: US 11,300,670 B2
(45) Date of Patent: Apr. 12, 2022

(54) WEAPON ON-BOARD VELOCITY AND RANGE TRACKING

(71) Applicant: BAE SYSTEMS Information and Electronic Systems Integration Inc., Nashua, NH (US)

(72) Inventors: Michael J. Choiniere, Merrimack, NH (US); Jason H. Batchelder, Lyndeborough, NH (US); Matthew F. Chrobak, Groton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 106 days.

(21) Appl. No.: 16/782,106

(22) Filed: Feb. 5, 2020

(65) Prior Publication Data
US 2021/0278516 A1 Sep. 9, 2021

(51) Int. Cl.
*F41G 9/00* (2006.01)
*G01S 11/08* (2006.01)

(52) U.S. Cl.
CPC ............... *G01S 11/08* (2013.01); *F41G 9/00* (2013.01)

(58) Field of Classification Search
CPC ................................. G01S 11/08; F41G 9/00
USPC ........................................................ 235/417
See application file for complete search history.

(56) References Cited

U.S. PATENT DOCUMENTS

| | | | | |
|---|---|---|---|---|
| 2002/0144619 | A1* | 10/2002 | Rawcliffe | F42C 13/045 102/214 |
| 2012/0274922 | A1* | 11/2012 | Hodge | G01S 17/42 356/28 |
| 2017/0219693 | A1* | 8/2017 | Choiniere | H04N 5/332 |
| 2021/0097147 | A1* | 4/2021 | DeVore | G06T 17/05 |

* cited by examiner

*Primary Examiner* — Daniel A Hess
(74) *Attorney, Agent, or Firm* — KPIP Law, PLLC; Gary McFaline

(57) ABSTRACT

The system and method of weapon on-board range and velocity tracking using a synchronized clock and a pulse beacon on a fire control system, or the like, coupled with an on-board rear-facing detector and processor. A round or a UAS may use this system to accurately estimate range with respect to the fire control system, over time, and the round's or UAS's velocity at various times along its flight path. The system provides for smaller miss distances, and the like.

14 Claims, 3 Drawing Sheets

WEAPON ON-BOARD VELOCITY AND RANGE TRACKING

FIELD OF THE DISCLOSURE

The present disclosure relates to precision guidance and more particularly to range and velocity tracking using an on-board range and velocity tracking system.

BACKGROUND OF THE DISCLOSURE

Current guidance systems typically use GPS tracking to provide position for a moving object over time and generate a velocity for the moving object over time. Other systems utilize communications feedback from a RADAR or LIDAR system emanating from a fire control system for tracking a moving object. In both cases, expensive hardware is utilized on the moving object, on the fire control system, or both. The velocity at launch establishes an overall range of the object and its trajectory to a target can be calculated. In the case of guided artillery, the velocity out of the cannon varies by 2 to 3% which results in large over and under range errors of about 1 to 3 Km depending on the range. This assessment for controlling the burn rate and resulting velocity at launch to better than 2 to 3% is based on power, temperature, humidity, power batch number, and the like over 1000's of test firings of artillery shells.

Wherefore it is an object of the present disclosure to overcome the above-mentioned shortcomings and drawbacks associated with the conventional precision guidance and tracking systems.

SUMMARY OF THE DISCLOSURE

One aspect of the present disclosure is a method of on-board range and velocity tracking, comprising: synchronizing a waveform using a master clock located on a fire control system; transmitting the synchronized waveform via a pulse beacon along with a code used to identify the waveform; launching a round from the fire control system, wherein the round travels a distance from the fire control system over time; transmitting a selected pulsed waveform via the pulse beacon; receiving, via a rear-facing receiver on-board the round, the transmitted selected pulsed waveform; generating a time stamp upon arrival of the transmitted selected pulsed waveform at the receiver; comparing, via an on-board processor, an arrival time to the synchronized waveform to determine a time delay; calculating the time delay and determining a position of the round relative to the fire control system; and determining the round's velocity by analyzing a plurality of positions relative to the synchronized waveform.

One embodiment of the method of on-board range and velocity tracking is wherein the round is a weapon, a projectile, a ballistic, a bullet, a munition, or a guided weapon. Another embodiment of the method of on-board range and velocity tracking is wherein the moving object is a UAS.

One embodiment of the method of on-board range and velocity tracking is wherein the pulse beacon is an IR/EO or RF beacon. In certain embodiments, the synchronized timing waveform and requisite time precision is embedded into the pulsed waveform.

Another embodiment of the method of on-board range and velocity tracking is wherein the pulsed waveform is a pre-scripted, staggered waveform, or pulse pattern, to mitigate potential jamming of the pulse beacon.

Yet another embodiment of the method of on-board range and velocity tracking is wherein the rear-facing receiver is a detector capable of receiving the waveform from the pulse beacon and processing a time stamp.

In some cases, an accuracy in range is limited by the synchronized waveform and the clock speed. In certain embodiments, a three meter accuracy over 1 Km and over 2 Km is attained by the system.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
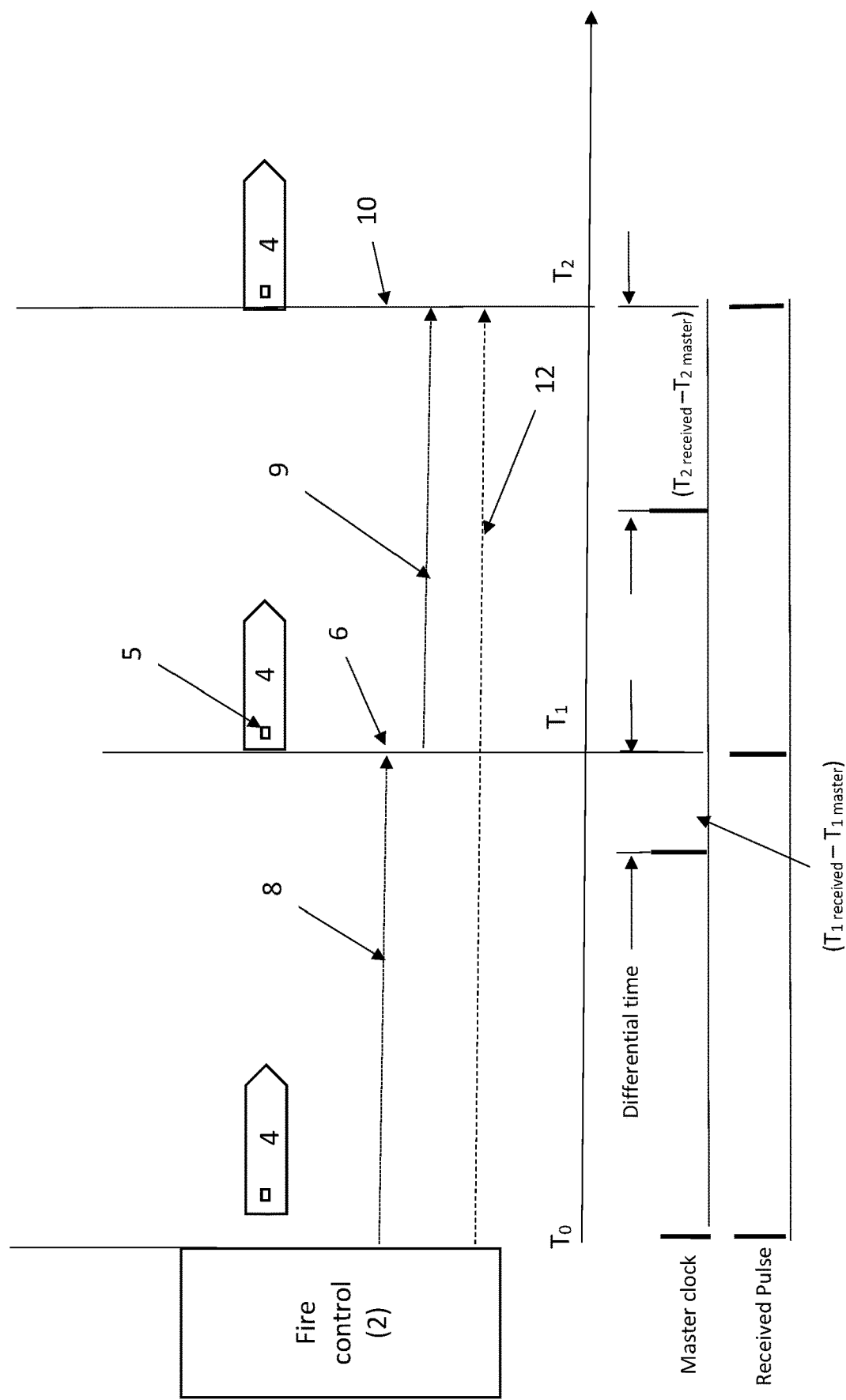
FIG. 1 is a diagram of one embodiment of the weapon on-board ranging and velocity tracking system according to the principles of the present disclosure.

Current range tracking systems are typically measured using RADAR or LIDAR and are located on a fire control system. This technique requires two path lengths (a first out to the object of interest and a second back to the fire control system) for determination of the range of the moving object. Thus, it becomes a $R^4$ rather than $R^2$ power problem. In these cases, a large RADAR/LIDAR system is also needed for tracking a small moving object at distance in order to provide sufficient transmission power over the distances traveled by the moving object.

In contrast, one embodiment of the present disclosure uses a RF or EO/IR signal illumination in a single direction coupled with a rear-facing detector located on-board the moving object. This reduces system cost and provides a moving object with the ability to determine its own range and velocity relative to the fire control system. This method allows for rough ranging using a communications link between the fire control system and the moving object as a means of clocking the position of the moving object from the fire control system and requires direct line of sight.

As described herein, it has been recognized that precise ranging and velocity tracking of a moving object can be achieved by measuring differential time from a synchronized source. In certain embodiments of the present disclosure, a moving object is a round or an unmanned aircraft system (UAS). As used herein, a round may be a weapon, a projectile, a ballistic, a bullet, a munition, a guided weapon, or the like. In one example of the system of the present disclosure, at the time of launch, a round, for example, can be programed via a fuse setter, or the like, and synchronized with a time source (e.g., a master clock) of a fire control system, or the like, to within 10 nanoseconds or approximately 10 feet of range resolution. In some cases, a particular time accuracy can be achieved by modifying the quality of the components used in the system. When the round is fired, the clock is already running and when the round's system (e.g., an on-board processor) is electronically awakened after the round is launched, the pre-synchronized timing allows the processor on-board the round to calculate ranging from the launch point to the location of the projectile, which can be determined at any given point along the round's trajectory within the initial synchronization parameters, in this example about 10 nanoseconds. By knowing a range and a time a velocity can be determined. By knowing the velocity of the round early in the flight and at lower altitudes (e.g., 5 to 20 K feet), the impact on the round's range, caused by the variability in velocity, can be mitigated or nullified by using a small canard system prior to reaching apogee where the canards would have virtually no control authority.

In certain embodiments, determining a range allows for a determination of a round's velocity. It is understood that rounds' velocities can vary a significant amount due, in part, to a variation in the actual propellant at launch. The amount of propellant material, its age, the humidity, and the like, are all factors that can amount to a variation of about 2-3% in launch velocity. Over a duration of a flight this velocity squared term can cause a large overshot in total distance traveled and can cause missed targets or even cause the round to hit an incorrect target. In some cases, the velocity variation occurs not just over the first 1% of a trajectory, but over the remaining 99% if there is active flight control.

Referring to FIG. 1, a diagram of one embodiment of the weapon on-board ranging and velocity tracking system according to the principles of the present disclosure is shown. More specifically, one embodiment of a method of the present disclosure is broken into two parts. First, when a round 4 is launched, a shock initiator starts a clock at the moment the round activates or launches, at time zero ($T_{0\ master}$). In some cases, the clock has less than about a 10 nanosecond precision.

Activation of the round typically starts at the moment the round leaves a launch tube in the fire control system 2. Once the round is activated, the system often has a large time/range variance due to the balance of the guidance and tracking system initiating, this initiation time period is a "wake up" period during which a distance 8 is traveled by the round, corresponding to time one ($T_{1\ received}$). In certain embodiments this distance 8 may be about 20 m or so of range before all of the guidance and tracking system is fully operational.

Second, when the round travels another distance 9 from $T_{1\ received}$ to $T_{2\ received}$, the pulse sent from the fire control and subsequently received by the round is delayed by an increased distance from the launch point. That delay ($T_{2\ received}-T_{2\ master}$) is converted to a distance (~1 foot per nanosecond) and can be added to the measured time (~1 nanosecond per foot) at the point between launch of the round and the first pulse received by the round or the initial offset ($T_{1\ received}-T_{1\ master}$) measured on-board the round or UAS.

The velocity of the round can be obtained using distance traveled and the time differential between the receipt of the first and second pulse after removing the clock's cycle time (measured between positions 6 and 10). The differential speed=speed of light/differential time ($T_{received}-T_{master}$). The current velocity=position 10−position 6/$T_{2\ received}-$$T_{2\ master}$. The current position=total differential time×speed of light. The delay in the pulse time of arrival is converted to a distance traveled when multiplied by the speed of light: distance=speed of light×time delay/differential. The velocity of the round is then determined by the distance traveled divided by the pulse interval ($T_{2\ master}-T_{1\ master}$).

Once the system up and running, the round 4 receives a waveform that starts a range timer at a range timer distance 6. The waveform in one example is a synchronization pulse that is within 100 MHz clock or about 10 nanoseconds via either a RF or an EO/IR emitter from the fire control system. In certain embodiments, the pulse repetition interval (PRI) of the waveform is held constant, for example, at about 1 Hz. In other cases, the clock pulse PRI will stretch during the duration of the flight. In some cases, a predetermined, asymmetric PRI waveform can be used such as a first pulse at 0.9955 Hz and a second pulse is at 1.0055 Hz, and so on. This can be used to help mitigate jamming.

The system and method of the present disclosure provides for measurement of a range and velocity from a fire control system to a round or UAS during the flight. That time value plus the first time measured represents a range time that is converted to a distance. This range accuracy should be less than 3 to 4 meters or about 10 to 13 ns (~1 foot per nanosecond given the speed of light). The same principle applies in this application. The initial pulse PRI provides the basis of determining the time difference between a master clock and the received pulse intervals on the UAS, or round. The time difference between the master clock and the received pulse time stamp is the differential time needed to determine distance from the fire control system. The current range position=total differential time×speed of light. This method could be applied to a projectile, UAS or weapon system at velocity from hovering to >Mach 5, from a few 100 meters to the limits of the pulse beacon system, typically line of sight. In some cases, the range, combined with a means of tracking heading (azimuth and elevation) using this method can accurately guide a round/weapon to a terminal handoff point within a circle error probable of 2 to 10 meters.

Still referring to FIG. 1, in certain embodiments the first pulse received by a rear-facing receiver or detector 5 on the round 4 or UAS becomes the time of a start of range timer $T_{1\ received}$ at position 6 following an initial offset distance 8. Following the start of the range timer at time $T_{1\ master}$, there is a stretch of time between a first pulse being received or detected on the round at position 6 and a second pulse being received or detected on the round at position 10 farther along the flight path $T_{2\ received}-T_{1\ received}$. The total range traveled 12 equals the range traveled between the second pulse being detected 9 plus the initial offset 8 or $T_{2\ received}-T_{2\ master}$.

In one example, the first pulse after launch is at 20 nanoseconds which is approximately equal to 20 feet, or 6.5 meters. In one embodiment, the time accuracy is determine by the needed range accuracy of the system, in most cases 10 nanoseconds (e.g., 3 meters) is sufficient for most weapon systems. The accuracy of the determined range is less than 20 meters, in this example, and is within the accuracy of the clock that is used.

In certain embodiments of the system of the present disclosure, a fuse setter, or the like, provides the means of transferring the time synchronization to a round from a fire control system. The fuse setter typically provides the round with pertinent digital/analog information for the particular mission and according to certain embodiments would be enhanced to include the transfer of time base synchronization according to the principles of the present disclosure.

Figure 2:
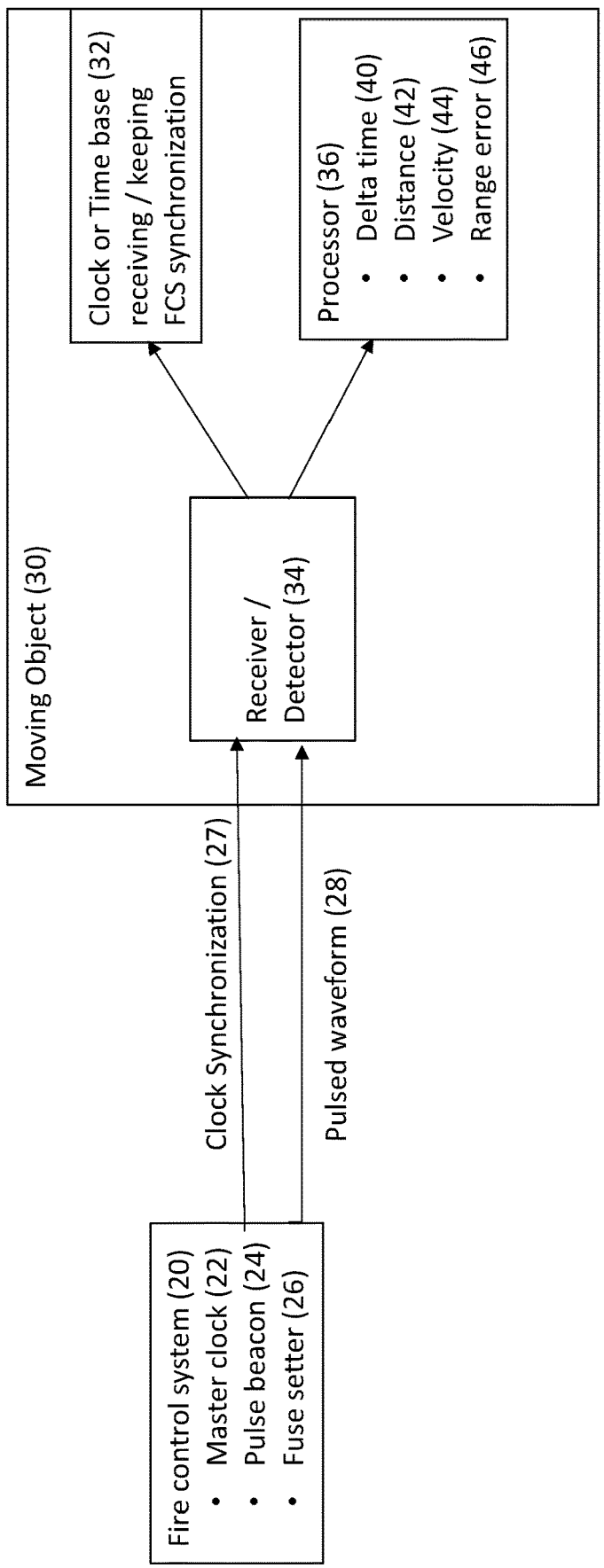
FIG. 2 is a diagram of one embodiment of an on-board ranging and velocity tracking system according to the principles of the present disclosure.

Referring to FIG. 2, a functional partitioning between the fire control system and the moving object is shown in diagrammatic form according to the principles of the present disclosure. More specifically, a fire control system 20, or the like comprises a master clock or time base 22. In the UAS case, smaller UAS are controlled via a tablet with the warfighter in the field, as a UAS control station instead of a fire control system as with rounds. In some embodiments, the fire control system 20 further comprises a fuse setter 26 or some other means of communicating with the moving object 30 prior to launch. In some cases, the fuse setter is used to generate a clock synchronization 27. A pulse beacon 24, or the like, transmits a pulsed waveform 28 having a prescribed timing sequence from the fire control system 20 to the moving object 30 which is received/detected by a detector/receiver 34 located on-board the moving object. In some cases, a clock or time base 32 on the moving object receives/retains the time synchronization sent form the fire control system. The pulse can be a singular pulse PRF or can be staggered. In some cases, the pulse is strictly used for timing purposes or is information as part of an active coded message used in controlling the function of the round or UAS. In certain embodiments, the coded message comprises instructions, command base, or information as a part of an active flight control used to position the weapon or UAS. A receiver or detector 34 on the moving object 30 captures the pulsed waveform 28, and an on-board processor 36 on the moving object 30 is configured to determine the differential time 40 between the master clock and a received pulse, which is converted to a distance traveled 42 from the fire control system, and ultimately a velocity of the moving object at launch 44. Once the actual velocity 44 at launch is known, the trajectory for the moving object can be adjusted for any variance in velocity from the ideal trajectory to the target; compensating for velocity induced range error 46.

Figure 3:
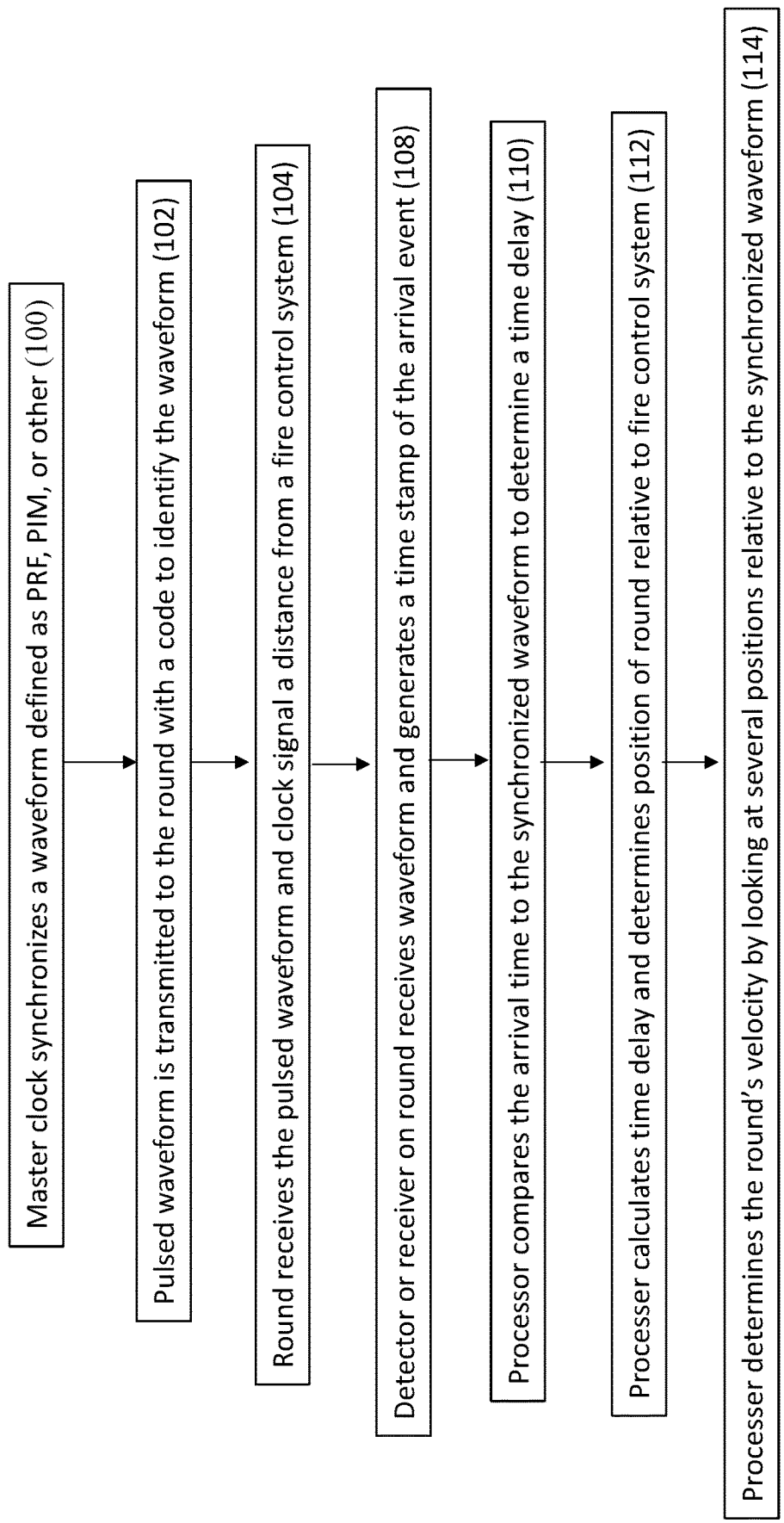
FIG. 3 is a flowchart of one embodiment of a method according to the principles of the present disclosure.

Referring to FIG. 3, one embodiment of a method of on-board velocity and range tracking according to the principles of the present disclosure is shown. More specifically, a master clock on a fire control system synchronizes a pulsed waveform emitted from a pulse beacon on the fire control system 100. In one embodiment of the system, a pulse beacon transmits a pre-scripted, staggered waveform, or pulse pattern, to mitigate potential jamming of the pulse beacon. The code for the scripted, staggered waveform, or pulse pattern can be loaded as a launch parameter in the fire control system. In some embodiments, the synchronized waveform is transmitted to the round or UAS with a corresponding code used to identify the transmitted waveform 102. In one embodiment of the system of the present disclosure, the round typically only turns on a communications capability to a fuse setter, or the like, as well as sufficient electronics to download the data for the mission into memory during the fuse setting process. In this application, a small on-board processor and a master clock remain active during fuse setting and during launch. The pulsed waveform is used by a processor on-board the round to calculate delta time, position, and velocity on the round or UAS relative to the fire control system. By preserving the time base, future measurements can be made when the remainder of the system is up and operational, generally about 2 to 3 minutes later (e.g., the time lag between fusing and firing), due to the loading/firing operational needs of the system.

Still referring to FIG. 3, in one example a round is launched and the round travels a distance from the fire control system 104 at launch. The pulse beacon, e.g., RF or IR/EO, transmits the prescribed time sequence. In one embodiment of the system, the pulse beacon can be RF or IR/EO depending on the range of the round. The fire control system sends the pulsed waveform according to a pre-selected waveform. In certain embodiments, the master clock at the fire control system can utilize a straight pulse repetition frequency (PRF) pulse train or a staggered pattern set to a predefined script, analogous to a Pulse Interval Modulation (PIM) code on a SAL seeker. In some embodiments, an on-board RF or IR/EO receiver is facing rear-ward in the direction of the fire control system, or the like. The receiver or detector on the round receives the pulsed waveform transmitted from the fire control system and provides a time stamp for the arrival of that pulse 108. The time stamp is compared to a synchronized timer event (if still at the launcher—no time differential) and the time differential is calculated based on the round's position 110 at that time. In certain embodiments, an on-board processor analyzes the pulse differential timing to determine differential range and tracks the round or UAS position 112 via the differential time data. The on-board processor then calculates a velocity profile via the differential range/differential time measured over several pulses (e.g., 4 to 5 events) 114.

The velocity information can be calculated in a couple of seconds from launch providing the round with timely and accurate range and velocity information. If the weapon's velocity has a 2 to 3% variance from shot to shot, then measurements need to be within ~10% of the variance or 0.3% in order to characterize the weapon's velocity variance. In some cases, a 3 meter accuracy over 1 Km is +/−0.3% (3 meters/1000 meters or 1 second at MACH 3), and over 2 Km+/−0.15% (2 seconds at MACH 3) is attained. By setting a clock timing accuracy<10 nanoseconds (3 meters), one can achieve the needed precision. Determining the velocity during this early portion of the launch helps in determining the overall range dispersion of the round, thereby allowing course correction on the way up to apogee, thus reducing the burden of range correction of the downward leg of the trajectory.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A moving object, comprising:
   a rear-facing receiver for receiving RF or EO/RF signals;
   a computer program product including one or more machine-readable mediums encoded with instructions that when executed by one or more on-board processors cause a process to be carried out for range and velocity tracking, the process comprising
   receiving a synchronized pulsed waveform transmitted via a pulse beacon on a fire control system along with a code used to identify the synchronized pulsed waveform;
   generating a time stamp upon arrival of the synchronized pulsed waveform at the rear-facing receiver;
   comparing an arrival time of the received pulse to the synchronized waveform to determine an initial time delay ($T_{1\ received} - T_{1\ master}$);
   calculating the time delay and determining a position of the moving object relative to the fire control system; and
   determining a velocity of the moving object at launch and over time by analyzing a plurality of positions of the moving object relative to the fire control system using the synchronized pulsed waveform.

2. The moving object according to claim 1, wherein the moving object is a round, a weapon, a projectile, a ballistic, a bullet, a munition, or a guided weapon.

3. The moving object according to claim 1, wherein the moving object is an unmanned aircraft system (UAS).

4. The moving object according to claim 1, wherein the pulse beacon is an IR/EO or RF beacon.

5. The moving object according to claim 1, wherein a time precision is embedded within the synchronized pulsed waveform.

6. The moving object according to claim 1, wherein the synchronized pulsed waveform is a pre-scripted, staggered waveform, or pulse pattern, to mitigate potential jamming of the pulse beacon.

7. The moving object according to claim 1, wherein the rear-facing receiver is a detector capable of receiving the synchronized pulsed waveform from the pulse beacon and processing a time stamp for time of arrival for a received pulse.

8. A method of on-board range and velocity tracking, comprising:
   synchronizing a pulsed waveform using a master clock located on a fire control system;
   transmitting the synchronized pulsed waveform via a pulse beacon located on a fire control system;
   transmitting a code used to identify the synchronized pulsed waveform via the pulse beacon located on the fire control system;
   launching a moving object from the fire control system, wherein the moving object generates a distance from the fire control system over time;
   receiving, via a rear-facing receiver on-board the moving object, the transmitted synchronized pulsed waveform;
   generating a time stamp upon arrival of the transmitted synchronized pulsed waveform at the rear-facing receiver;
   comparing, via an on-board processor, an arrival time to the synchronized pulsed waveform to the synchronized pulsed waveform to determine a time delay;
   calculating the time delay and determining a position of the moving object relative to the fire control system; and
   determining the moving object's velocity by analyzing a plurality of positions relative to the fire control system using the synchronized pulsed waveform.

9. The method of on-board range and velocity tracking according to claim 8, wherein the moving object is a round, a weapon, a projectile, a ballistic, a bullet, a munition, or a guided weapon.

10. The method of on-board range and velocity tracking according to claim 8, wherein the moving object is an unmanned aircraft system (UAS).

11. The method of on-board range and velocity tracking according to claim 8, wherein the pulse beacon is an IR/EO or RF beacon.

12. The method of on-board range and velocity tracking according to claim 8, wherein a time precision is embedded into the synchronized pulsed waveform.

13. The method of on-board range and velocity tracking according to claim 8, wherein the synchronized pulsed waveform is a pre-scripted, staggered waveform, or pulse pattern, to mitigate potential jamming of the pulse beacon.

14. The method of on-board range and velocity tracking according to claim 8, wherein the rear-facing receiver is a detector capable of receiving the waveform from the pulse beacon and processing a time stamp of time of arrival for a received pulse.

\* \* \* \* \*